(12) United States Patent
Geiger

(10) Patent No.: US 7,183,743 B2
(45) Date of Patent: Feb. 27, 2007

(54) ADAPTER SYSTEM FOR RECHARGING PORTABLE ELECTRONIC DEVICES AND ITS ASSOCIATED METHOD OF USE

(76) Inventor: Dan Geiger, 18 Cassell Rd., Souderton, PA (US) 18964

( * ) Notice: Subject to any disclaimer, the term of this patent is extended or adjusted under 35 U.S.C. 154(b) by 167 days.

(21) Appl. No.: 10/739,368

(22) Filed: Dec. 19, 2003

(65) Prior Publication Data

US 2005/0134214 A1 Jun. 23, 2005

(51) Int. Cl.
*H01M 10/46* (2006.01)
(52) U.S. Cl. .................................................... 320/111
(58) Field of Classification Search ................ 320/107, 320/111, 114, 115; 362/640, 652, 657
See application file for complete search history.

(56) References Cited

U.S. PATENT DOCUMENTS

| | | | | |
|---|---|---|---|---|
| 6,127,803 A | * | 10/2000 | Wang et al. ................. | 320/114 |
| 6,227,888 B1 | * | 5/2001 | Hahn ........................... | 439/173 |
| 6,806,682 B2 | * | 10/2004 | Hsiao ........................... | 320/107 |
| 2002/0195993 A1 | | 12/2002 | Chiu | |
| 2003/0025476 A1 | * | 2/2003 | Trela ............................ | 320/107 |
| 2003/0037954 A1 | * | 2/2003 | Wu ............................... | 174/92 |
| 2004/0085043 A1 | * | 5/2004 | Germagian et al. ......... | 320/107 |
| 2004/0085694 A1 | * | 5/2004 | Germagian et al. .......... | 361/90 |

* cited by examiner

*Primary Examiner*—Edward H. Tso
(74) *Attorney, Agent, or Firm*—LaMorte & Associates

(57) ABSTRACT

A recharging system for portable electronic devices that have specialized recharging ports and accept only specifically shaped connectors. The recharging system includes a plug connector for engaging an external power source. A generic terminal connector is also provided. A wire cord is used to connect the plug connector and the terminal connector. At least one adaptor is provided. Each adaptor has a receptacle and a specialized connector. The receptacle selectively receives and electrically interconnects with the generic terminal connector. The specialized connector on the adaptor selectively engages the portable electronic device, therein electrically interconnecting the portable electronic device to the generic terminal connector. The portable electronic device is then recharged by the flow of electricity through the generic terminal connector.

14 Claims, 4 Drawing Sheets

ADAPTER SYSTEM FOR RECHARGING PORTABLE ELECTRONIC DEVICES AND ITS ASSOCIATED METHOD OF USE

BACKGROUND OF THE INVENTION

1. Field of the Invention

In general, the present invention relates to recharging systems for portable electronic devices. More particularly, the present invention relates to recharging systems with variable adaptors that enable a single recharging system to be used on more than one type of portable electronic device.

2. Description of the Prior Art

Modern society is replete with various portable electronic devices, such as mobile telephones, pagers, personal digital assistants (PDAs), laptop computers and the like. Most all of these portable electronic devices contain rechargeable batteries. In order to recharge the batteries in such devices, the battery must be connected to an external source of electricity.

With some models of portable electronic devices, the rechargeable batteries from within the device must be removed and taken to a separate recharging unit. This type of recharging system is commonly used with battery powered power tools and battery operated toys. However, with small portable electronic devices, it is commonplace to leave the battery within the device and connect the entire device to a recharging system.

Rechargeable batteries typically require direct current of a specific voltage in order to recharge properly. A typical prior art recharging system is designed to plug into the AC receptacle of a common home. Consequently, many prior art recharging systems contain transformers for converting alternating current from the wall receptacle to the direct current needed to recharge the batteries. The transformer is then typically connected to a cord that terminates with a connector. The connector is received by a recharging port built into the portable electronic device.

A problem that occurs is that each type and model of portable electronic device tends to be manufactured with a recharging port that is specific to that make and model of device. As such, the recharging system of one type of portable telephone cannot be used to charge a portable telephone of a different make or model.

As has been previously explained, the use of portable electronic devices is becoming prolific in modern society. It is not uncommon for one family to own and use multiple portable telephones, PDAs, portable computers and the like. Each of these portable electronic devices requires its own recharging system with a cord connector that joins to that device. As such, it is not uncommon for a family to have multiple recharging systems connected to various wall receptacles throughout the house. This is inconvenient, in that it causes the recharging systems to occupy wall receptacles in the house. Furthermore, the prolificacy of recharging units and cords throughout a house is unsightly.

In addition to AC wall receptacles, many people recharge their portable electronic devices using a power jack in their automobiles. Automobiles have batteries that provide direct current. Thus, when a portable recharging device is connected to the battery of an automobile, no transformer is needed. Rather, recharging systems powered by automobiles typically include a cord with a connector termination at each end. One connector termination is sized to engage the cigarette lighter power jack within the automobile. The opposite connector termination is formed to engage the recharging port of a particular portable electronic device. As a result, a different recharging system is again needed for each and every make and model of electronic device that is to be recharged.

From the above, it will be understood that if a person only has one portable electronic device, he/she would still need one recharging system for the home and a separate recharging unit for the automobile. For each additional portable electronic device, yet another set of recharging systems would have to be acquired. As such, the cost of the equipment needed to recharge portable electronic devices becomes substantial.

In the prior art, attempts have been made to simplify the number of recharging systems needed to recharge a particular portable electronic device. For example, in U.S. Patent Application Publication No. 2002/0195993, to Chiu, entitled Structure Of An Adaptor For Mobile Telephones, a recharging device is provided that can be connected to a laptop computer. This enables the laptop computer to charge the mobile telephone. However, the laptop computer itself still requires its own recharging unit. Although such devices reduce the number or recharging units needed to recharge a portable electronic device from different power sources, the recharging system still can only connect to one specific portable electronic device.

A need therefore exists in the art for a recharging system for both AC wall receptacles and DC automobile power jacks that enables different makes and models of portable electronic devices to be recharged using only a single assembly. In this manner, a person need only purchase and utilize one recharging system for all the portable electronic devices that person owns.

SUMMARY OF THE INVENTION

The present invention is a recharging system for portable electronic devices, such as mobile telephones and PDAs, that have specialized recharging ports and accept only specifically shaped connectors. The recharging system includes a plug connector for engaging an external power source. A generic terminal connector is also provided. A wire cord is used to connect the plug connector and the terminal connector. At least one adaptor is provided. Each adaptor has a receptacle and a specialized connector. The receptacle selectively receives and electrically interconnects with the generic terminal connector. The specialized connector on the adaptor selectively engages the portable electronic device, therein electrically interconnecting the portable electronic device to the generic terminal connector. The portable electronic device is then recharged by the flow of electricity through the generic terminal connector.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention can be used to recharge most any type of portable electronic device, such as a PDA or a laptop computer, the present invention is particularly well suited for recharging different makes and models of mobile telephones. According, by way of example, the present invention recharging system will be described in an application where it is being used to recharge a plurality of different makes and models of portable telephones. This is done merely to set forth the best mode contemplated for the invention and should not be considered a limitation on the application of the present invention as claimed.

Figure 1:
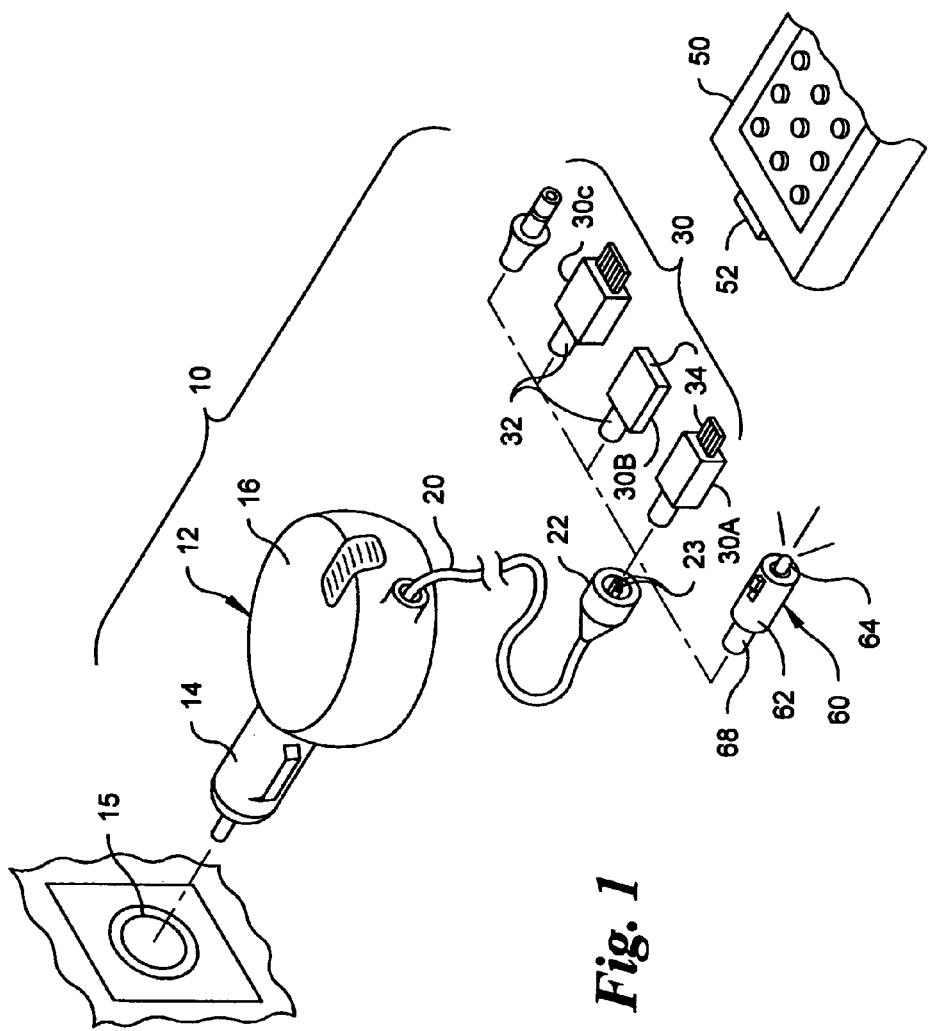
FIG. 1 is a perspective view of a first exemplary embodiment of the present invention recharging system, shown in conjunction with a mobile telephone and an automobile cigarette lighter power jack.

Referring to FIG. 1, a first exemplary embodiment of a recharging system 10 is shown in accordance with the present invention. In the shown embodiment, there is shown a recharging system 10 that can be used to recharge the batteries of a plurality of different makes and models of portable telephones. The shown embodiment of the recharging system has a housing 12. Molded into the housing 12 is an automobile power jack connector 14. The power jack connector 14 is sized to engage and connect with the standard sized cigarette lighter power jack port 15 contained within most late model automobiles.

The housing 12 defines a reel chamber 16. Within the reel chamber 16 is a spool around which is wound a retractable cord 20. The retractable cord 20 contains two wires for carrying positive and negative biased direct current. The retractable cord 20 is connected to the power jack connector 14 within the housing 12. As a result, when the power jack connector 14 is pushed into the power jack receptacle 15 within an automobile, the electrical potential of the negative and positive terminals of the automobile's battery are supplied to the two wires within the retractable cord 20.

The free end of the retractable cord 20 terminates with a generic terminal connector 22. The generic terminal connector 22 has two terminals 23, wherein each terminal 23 is connected to a separate one of the wires in the retractable cord 20. Thus, of the two terminals 23 that are present in the generic terminal connector 20, one terminal is a positive terminal and the other terminal is a negative terminal.

A plurality of adaptors 30 are provided. Each adaptor 30 has a connector port 32 that engages the generic terminal connector 22 at the end of the retractable cord 20. On the side of each adaptor 30, opposite the connector port 32, is a specialized connector 34 for a specific make and model of a portable electronic device 50. The specialized connector provides terminals of the proper size and position to connect to the portable electronic device 50 and recharge its internal batteries.

In commerce, there exist dozens of different makes and models of portable electronic devices 50, such as mobile telephones. Many of these portable electronic devices 50 have recharging ports 52 that are unique and/or proprietary to that make and model of device. In the shown embodiment, the portable electronic device 50 is a mobile telephone. The recharging system 10 provides adaptors 30 for each of the major makes and models of portable telephones. For instance, a first adaptor 30A may be provided for a first model of Motorola portable telephone. A second adaptor 30B may be provided for a second model of Motorola portable telephone. A third adaptor 30C may be provided for an Epson model portable telephone. The number of adaptors 30 that can be provided is limited only by the different makes and models of portable telephones that are available in the marketplace.

In addition to the adaptors 30 that join to the generic terminal connector 22, a light assembly 60 can also be provided. The light assembly 60 contains a casing 62 with a light source 64, such as high output LED or incandescent bulb, at one end. On the casing 62 is an on/off switch 66 that controls the operation of the light source 64. The light source 64 has a connector port 68 that selectively connects with the generic terminal connector 22, thereby providing power to the light assembly 60.

Many drivers keep a flexible light connected to the cigarette lighter jack port. By providing a light assembly 60 that can connect to the end of the retractable cord 20, the recharging system 10 need not be removed to have a light at that position. Furthermore, by providing a light assembly 60 at the end of the flexible cord 20, the light assembly 60 can be extended with the retractable cord 20 and used to view under the seats and other poorly illuminated spots within the vehicle.

Figure 2:
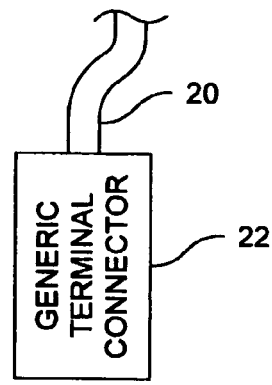
FIG. 2 is a schematic of an adaptor illustrating its interconnection with a generic terminal connector and the recharging port of a portable electronic device.
Figure 2:
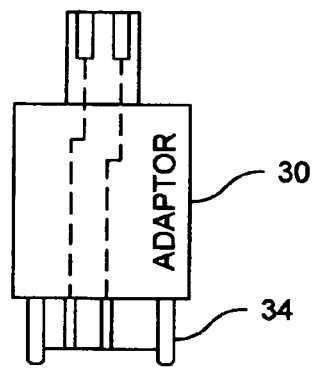
Figure 2:
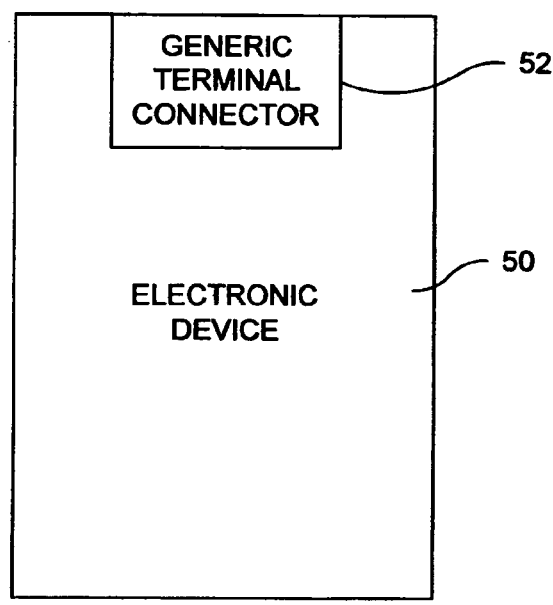

Referring to FIG. 2, it will be understood that different makes and models of portable electronic devices 50 contain recharging ports 52 of different shapes and styles. With many simple electronic devices, the recharging port is a simple circular connection for receiving a coaxial DC power connector (See coaxial connector 30D in FIG. 1). However, with mobile telephones, PDAs and other complex electronic devices, the recharging port is also used as the port where accessory devices can be interconnected with a particular electronic device. For example, the recharging port of a mobile telephone is also the connector port where a hands-free speaker may connect to the mobile phone. It is for this reason that the recharging port of many mobile telephones and similar devices are sized and shaped to receive complex plugs. These plugs are often proprietary to the manufacturer and contain multiple contact pins. Of all the contact pins that are contained within the proprietary plug, two of the pins are dedicated to power transfer. One pin provides positive current to the electronic device and the other pin provides negative current.

In the present invention recharging system, each adaptor 30 is provided with a specialized connector 34 that mimics the shape of the proprietary plug used by a particular portable electronic device 50. The specialized connector 34 positions a positive terminal pin and a negative terminal pin in the proper locations required by the portable electronic device 50 being recharged. Thus, the adaptor 30 enables the generic terminal connector 22 at the end of the retractable cord 20 to interconnect with a proprietary recharging port 52 of a particular portable electronic device 50.

Figure 3:
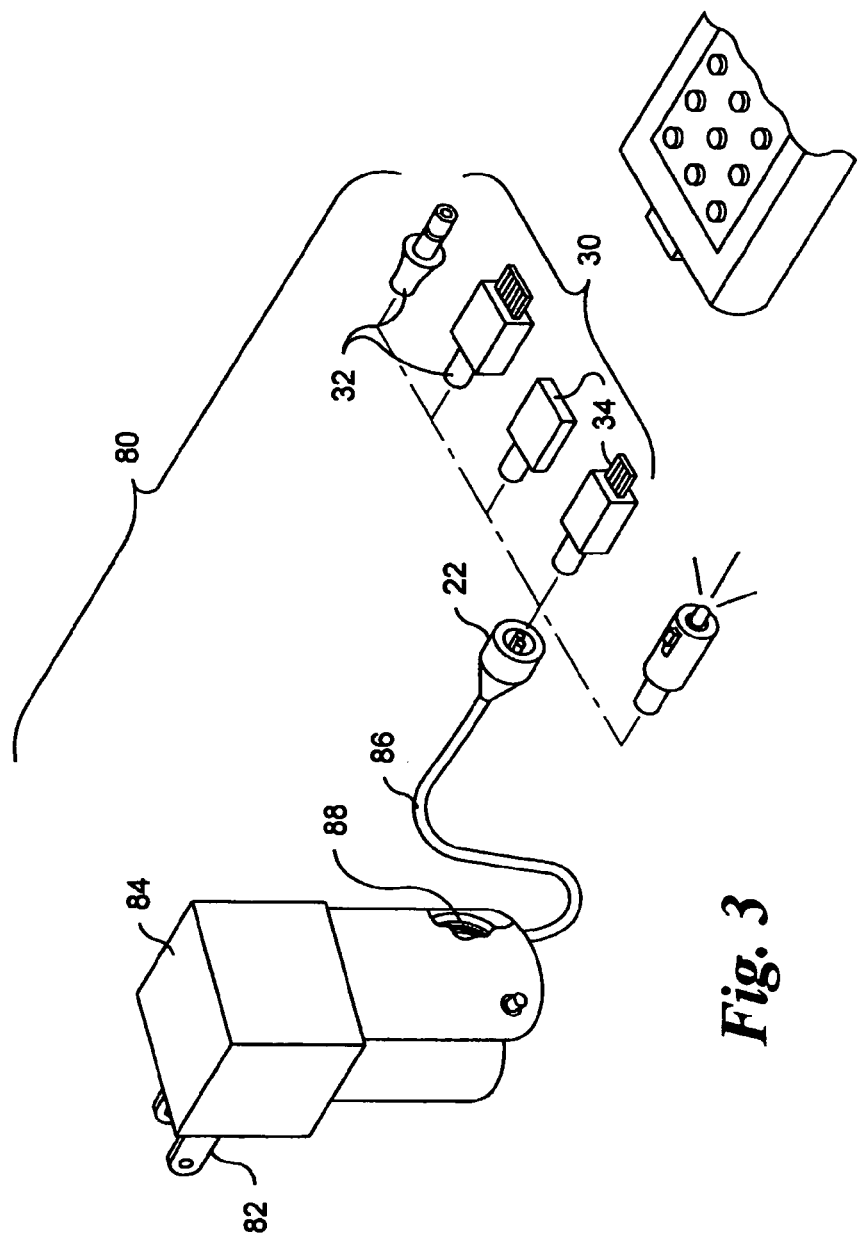
FIG. 3 is a perspective view of a second exemplary embodiment of the present invention recharging system.

Referring to FIG. 3, an alternate embodiment of the present invention recharging system 80 is shown. In this embodiment, an AC plug 82 is provided that is sized to fit with the AC wall receptacle of a typical home. The AC plug 82 extends from a housing 84. Within the housing 84 is contained an AC/DC transformer that converts the incoming AC current into a lower voltage DC current. The DC output is directed into a duel wire power cord 86, wherein one wire runs the negative bias and one wire runs the positive bias of the DC current.

Also contained within the housing 84 is a retraction reel 88 that is used to selectively retract the power cord 86 into the housing 84. The retraction reel 88 enables the power cord 86 to be extended from the housing 84 at different lengths when the power cord 86 is being used to reach and charge a mobile telephone or similar electronic device. The retraction reel 88 may also include a selective ratchet system that enables the power cord 86 to be locked in an extended length when in use. Many designs of retractable reels exist in the prior art for use with wire power cords, most such known retractable reel designs can be adapted for use within the present invention recharging system 80.

The end of the power cord 86 terminates with a generic terminal connector 22. The generic terminal connector 22 can be attached to a variety of different adaptors 30. Each adaptor 30 contains a connector port 32 for receiving the generic terminal connector 22 and a specialized connector 34 for connecting to a portable electronic device in the manner that has already been described.

Figure 4:
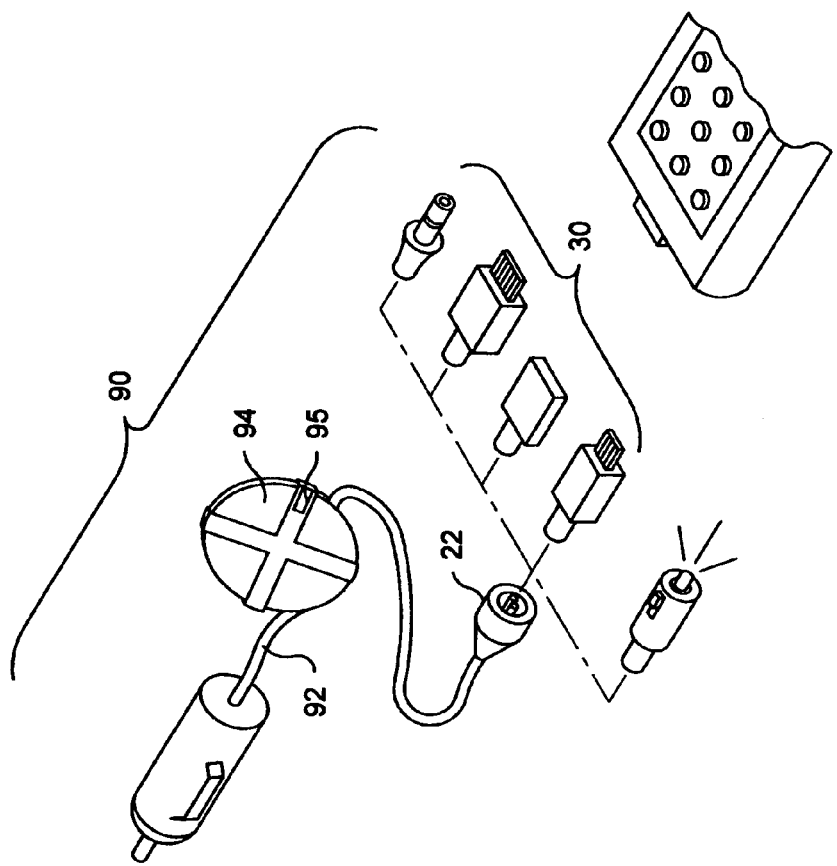
FIG. 4 is a perspective view of a third exemplary embodiment of the present invention recharging system.

Referring to FIG. 4, yet another embodiment of the present invention recharging system 90 is shown. In this embodiment, a power cord 92 is wrapped around a retraction reel 94 that is disposed along the length of the power cord 92. The power cord 92 can be selectively pulled out of the retraction reel 94 to different lengths. A release 95 is disposed on the exterior of the retraction reel 94 that enables the power cord 92 to be automatically rewound into the retraction reel 94 when pressed.

The power cord 92 ends with a generic terminal connector 22. The generic terminal connector 22 interconnects with one of a variety of adaptors 30, as has previously been explained.

The present invention recharging system enables a consumer to buy one recharging system for a wide variety of differing electronic devices. The system can be purchased with a variety of adaptors, or specific adaptors can be purchased separately at low cost. However, it will be understood that the embodiments of the present invention that are illustrated and described are merely exemplary and that many variations of the shown embodiments can be produced. For example, there exist hundreds of portable electronic devices that require hundreds of different recharging plugs. The present invention only shows a few adaptors for a few portable electronic devices, it will be understood that adaptors can be provided for any style of recharging plug that may exist. All such modifications and alternate embodiments are intended to be included within the scope of the present invention recharging system as defined by the claims below.

What is claimed is:

1. A system for providing illumination and recharging portable electronic devices, said system comprising:
    a plug connector for engaging an external power source;
    a terminal connector;
    a cord extending between said plug connector and said terminal connector, wherein said cord electrically interconnects said plug connector to said terminal connector; and
    a plurality of different adaptors, each of said adaptors having a receptacle and a specialized connector, wherein said receptacle on each of said receptacles selectively receives and electrically interconnects with said terminal connector, and wherein said specialized connector on each of said adaptors selectively engages a portable electronic device, therein electrically interconnecting the portable electronic device to the terminal connector; and
    a light assembly having a power port thereon that selectively connects with said terminal connector in place of one of said adaptors, wherein said light assembly receives electricity through said terminal connector and is activated when connected to said terminal connector.

2. The system according to claim 1, wherein each of said adaptors has a different specialized connector for engaging a particular model of portable electronic device.

3. The system according to claim 1, further including a reel, wherein said cord is wound on said reel and can be selectively unwound from said reel when pulled from said reel.

4. The system according to claim 3, wherein said plug connector and said reel are disposed in a common housing, wherein said cord extends from said housing.

5. The system according to claim 3, wherein said reel is disposed along said cord between said plug connector and said terminal connector.

6. The system according to claim 1, further including an AC/DC transformer coupled to said plug connector.

7. The system according to claim 1, wherein said plug connector is an automobile power jack connector.

8. A system for providing illumination and recharging a plurality of portable electronic devices, wherein each of said portable electronic devices has a specialized recharging port, said system comprising:
    a recharging unit that can be selectively connected to an external power source, wherein said recharging unit directs electricity from said external power source to a terminal connector;
    a plurality of adaptors, wherein each of said adaptors has a terminal port for receiving said terminal connector and a specialized plug that selectively connects to said specialized recharging port of a different one of said portable electronic devices; and
    a light assembly having a power port thereon that selectively connects with said terminal connector in place of one of said adaptors, wherein said light assembly receives electricity through said terminal connector when connected thereto.

9. The system according to claim 8, wherein said recharging unit includes a plug connector for engaging the external power source and a cord that extends between said plug connector and said terminal connector, wherein said cord electrically interconnects said plug connector to said terminal connector.

10. The system according to claim 9, further including a reel, wherein said cord is wound on said reel and can be selectively unwound from said reel when pulled from said reel.

11. The system according to claim 10, wherein said plug connector and said reel are disposed in a common housing, wherein said cord extends from said housing.

12. The system according to claim 10, wherein said reel is disposed along said cord between said plug connector and said terminal connector.

13. The system according to claim 9, further including an AC/DC transformer coupled to said plug connector.

14. The system according to claim 9, wherein said plug connector is an automobile power jack connector.

* * * * *